United States Patent

[11] 3,539,223

[72] Inventor Rene Bovagne
 Chalon-Sur-Saone, France
[21] Appl. No. 762,188
[22] Filed Sept. 16, 1968
[45] Patented Nov. 10, 1970
[73] Assignee Societe Des Forges Et Ateliers Du Creusot,
 Paris, France,
 a company of France
[32] Priority Feb. 7, 1968
[33] France
[31] 138,950

[54] SYSTEM FOR THE INTRODUCTION OF POWDERY MATERIAL INTO AN ENCLOSURE CONTAINING A GAS
 11 Claims, 4 Drawing Figs.
[52] U.S. Cl. .................................................... 302/36,
 302/42, 302/51, 302/57
[51] Int. Cl. ...................................................... B65g 53/40
[50] Field of Search ........................................... 302/36, 42,
 51, 57

[56] References Cited
 UNITED STATES PATENTS
 241,447 5/1881 Thorpe ..................... 302/42

Primary Examiner—Richard E. Aegerter
Assistant Examiner—Alfred N. Goodman
Attorney—Cameron, Kerkam and Sutton ABSTRACT: This invention is concerned with apparatus for feeding pulverulent material to a gas charged enclosure, the apparatus including a supply duct extending into a conduit in the enclosure which conduit has a control valve.

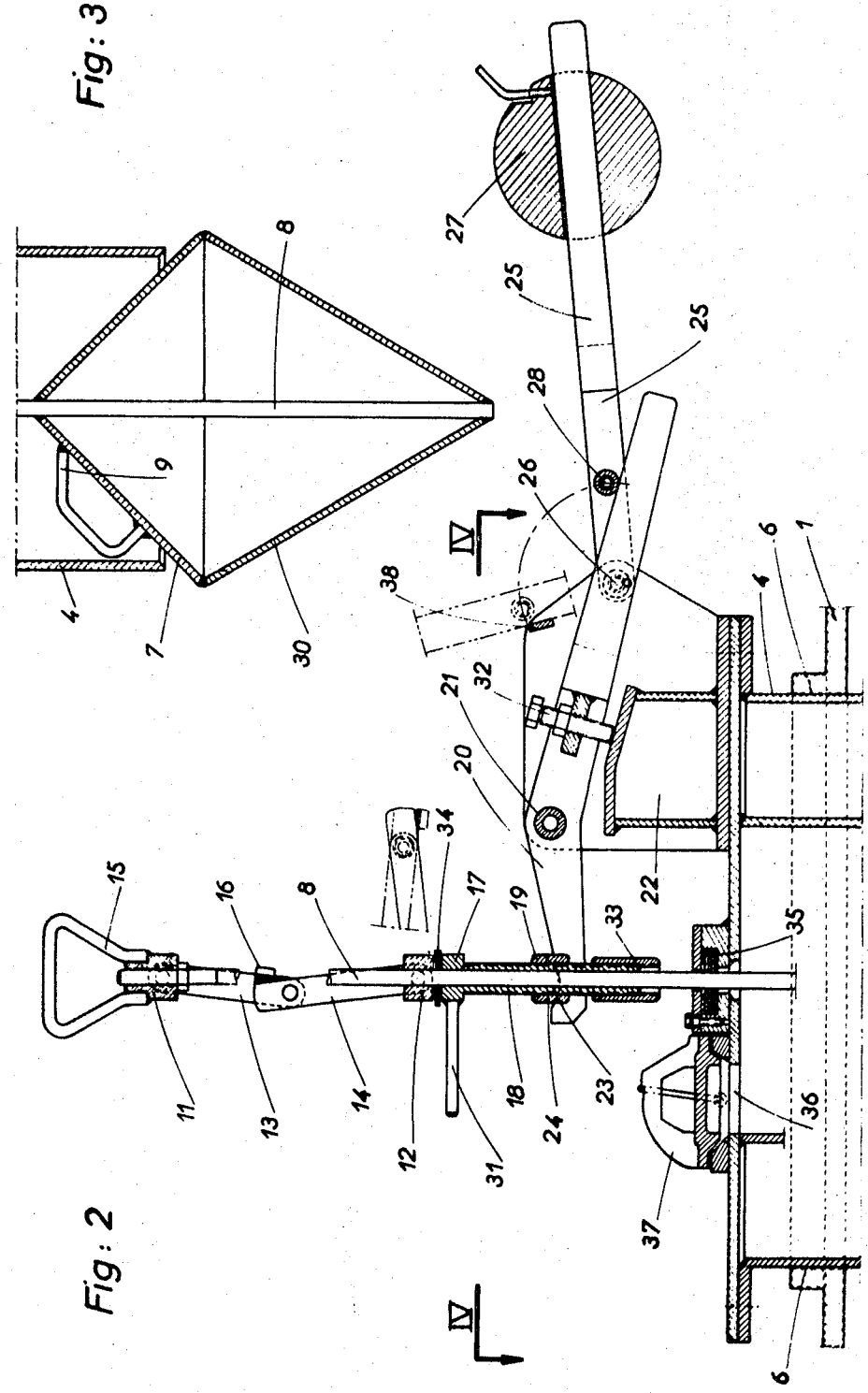

SYSTEM FOR THE INTRODUCTION OF POWDERY MATERIAL INTO AN ENCLOSURE CONTAINING A GAS

The invention relates to a system for the introduction of powdery material into an enclosure containing a gas.

The system according to the invention can be used in any enclosures in which a powdery material must be distributed regularly, but it is preferably used for tubes for distributing materials in ducts through which gases pass, particularly in preheating plants of cement works.

Plants for the production of cement by the "dry-method" process have a rotary furnace preceded by a preheating plant, which is generally composed of a set of cyclones connected by ducts in which the raw material is brought into contact with the gases issuing from the furnace and thus preheated before being introduced into the furnace.

This process has considerably increased the thermal efficiency of the plants. But it is difficult to obtain regular distribution of the material in the gas current passing through the ducts; this distribution has to be effected in a thin layer to facilitate heat exchange and the taking over of the material. It is also advantageous to be able to regulate the height of the orifice for distributing powder in the duct, taking account, for example, of the temperature of the gases or of their passage through the duct.

The invention satisfies these requirements and relates to a system for introducing powdery material into an enclosure containing a gas, this system comprising: a duct for supplying material, entering the enclosure, a vertical conduit open at the bottom, into which conduit the supply duct opens, a movable valve for closing the lower orifice of the vertical conduit and a system for controlling the position of the valve.

According to the invention, the movable valve is a cone whose apex faces upwards, held by a rod slidable along the axis of the vertical conduit and extending as far as the exterior of the vertical conduit and the enclosure, and the system for controlling the positions of the valve has a suspension element secured to the top of the rod and supported by a support means of adjustable height mounted on the enclosure.

The invention will now be described with reference to a specific embodiment given by way of example and shown in the drawings.

FIG. 2 is a detailed view of the suspension element and the support means in section along II–II in FIG. 4;

FIG. 3 shows a detail of the distribution valve; and

Figure 1:
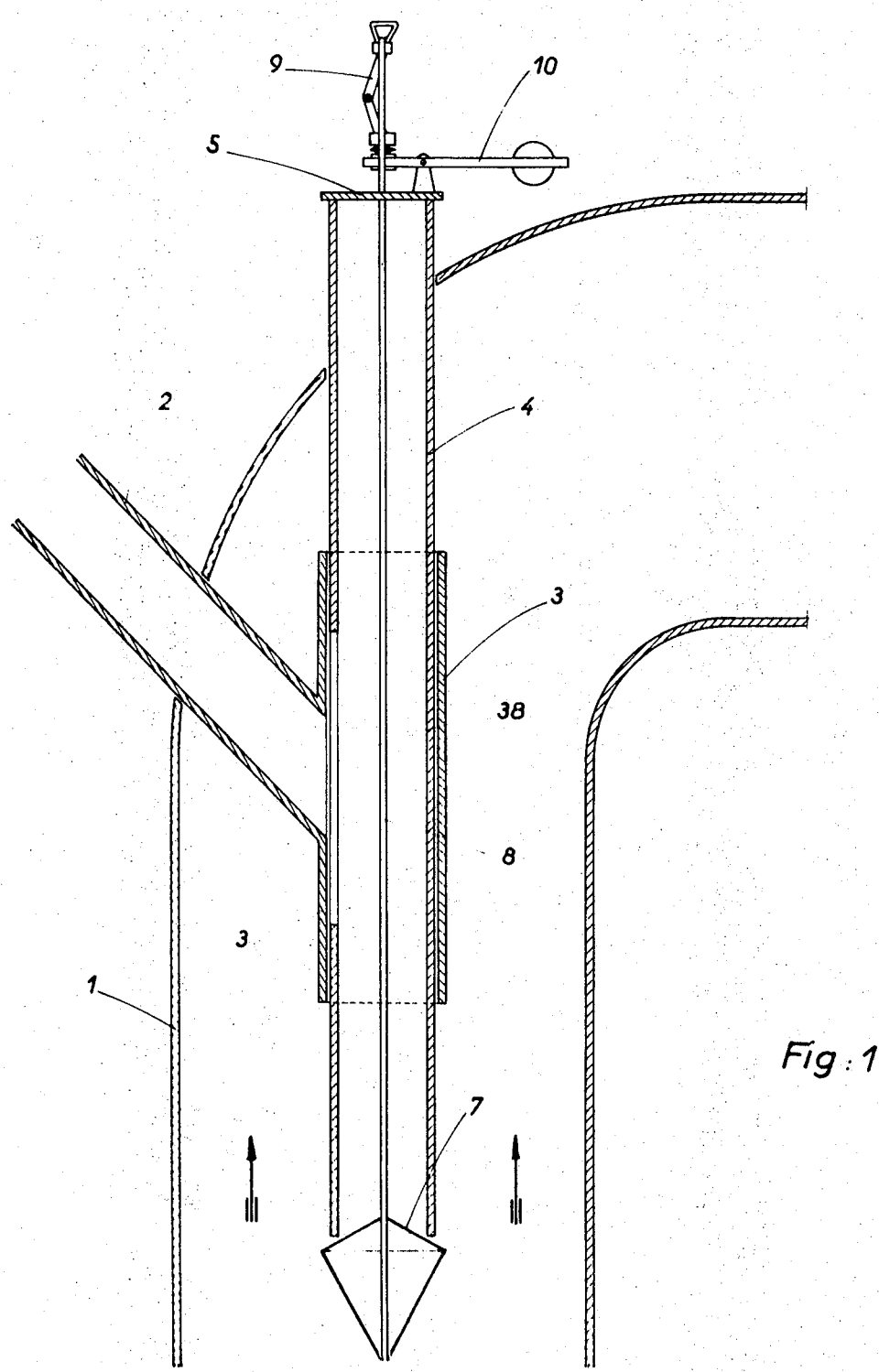
FIG. 1 is a diagrammatic view of the system as a whole.
Figure 4:
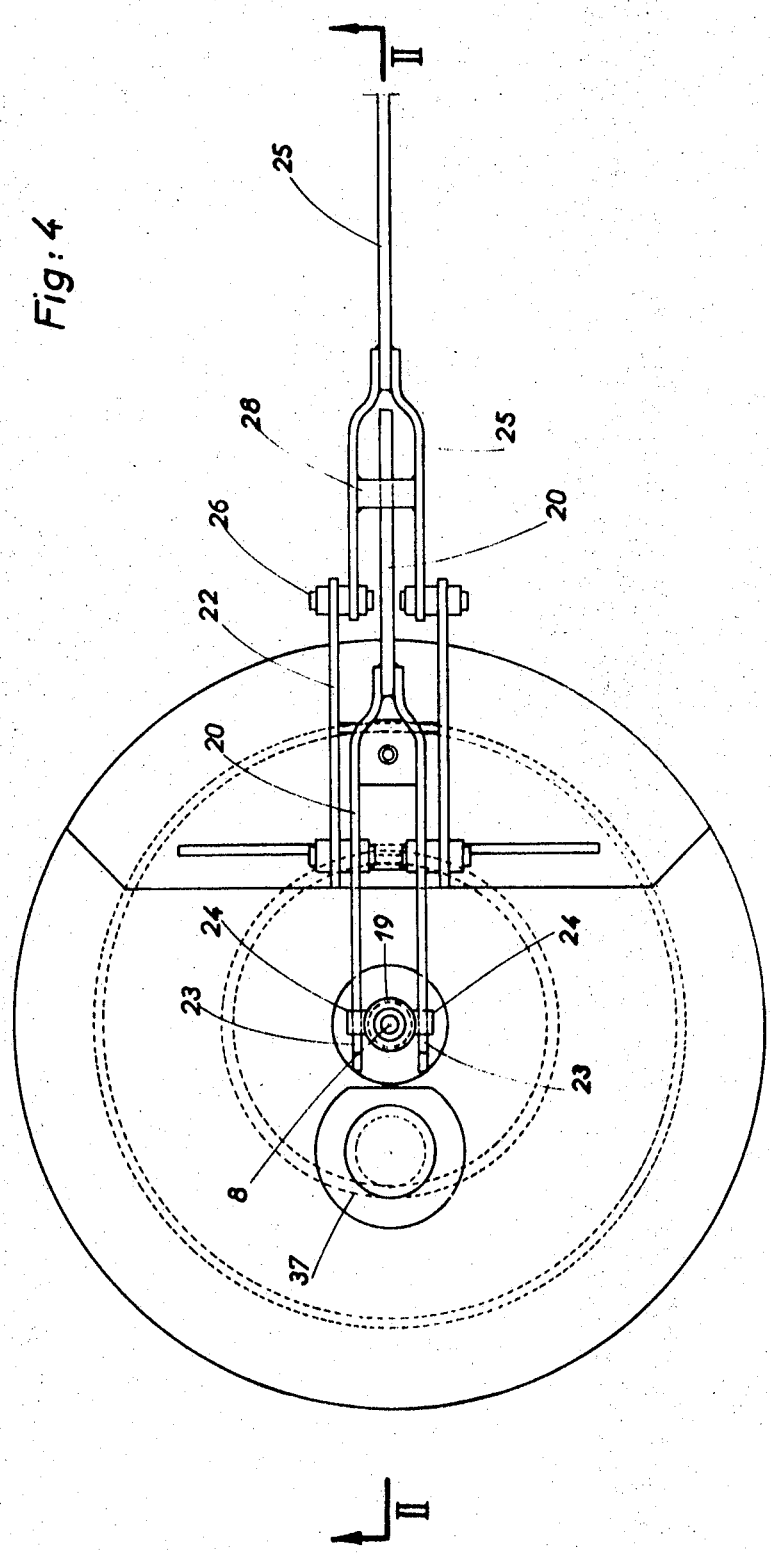
FIG. 4 is a plan view of the suspension element and the support means in section along IV–IV in FIG. 2.

The system is mounted in an enclosure 1 (FIG.1), which, in the example shown, is a conduit connecting two cyclones of a cement-works preheater and through which an ascending current of hot gases passes.

A duct for supplying materials 2 enters the conduit 1 and terminates in a cylindrical pipe section 3 with a vertical axis. A cylindrical tube 4 closed at the top by a cap 5 slides in the pipe section 3.

The tube 4 is extended as far as the outside of the enclosure and passes through an orifice 6 provided with a seal and an element for securing the tube (not shown).

The tube 4 may be closed at the bottom by a valve 7 held by a rod 8, the top end of which is secured to a suspension element 9 supported by a support means 10 mounted on the cap 5.

The suspension element is composed of an upper ring 11 (FIG. 2) secured to the rod 8, a lower ring 12 in which the rod slides and two pivoting arms 13 and 14 forming a knee piece and mounted pivotably on the ring 11 and the ring 12 respectively. Each arm is formed by two links framing the rod and the rings. The upper ring 11 has a handle 15 by which the rod may be lifted. To the link 14 there is secured a stop 16, which is displaced with respect to the axis of the link and on which abuts the link 13, so that the two links hold the ring 11 in the top position.

The suspension element is supported by the support means 10, which is composed of a support block 17 extended to form a screw 18 rotating in a nut 19, the whole having a central bore in which the rod 8 can slide.

The nut 19 is supported by a lever 20, which pivots about a spindle 21 carried by a support 22 mounted on the cap 5. The lever 20 has two arms, which frame the nut 19 and which have plates 23, which support knives 24 secured on either side of the nut 19.

An arm 25 pivoting about a spindle 26 mounted on the support 22 carries at its end a counter-weight 27 whose position is adjustable. A spindle 28 secured to the arm 25 bears on the end of the lever 20, so that the counter-weight 27 balances the thrust exerted by the suspension element on the lever 20.

The valve 7 is composed of sheet metal in the form of a cone whose apex points upwards and whose base has a diameter slightly greater than that of the tube 4. Keys 29, which hold the valve centred on the axis of the tube 4, allowing a certain amount of play, are secured to the sheet metal member 7. The valve is extended to form a cone 30 for guiding rising gases, the apex of which points downwards.

When the tube 4 is empty, the weight of the counter-weight 27 urges the valve 7 against the outlet of the tube 4, and thus prevents the gases from rising in the tube 4.

When the duct 2 is supplied with powdery materials, the latter accumulate in the tube 4 above the valve until their weight balances the action of the counter-weight 27. The materials are poured into the conduit 1, forming a thin conical sheet, and are entrained by the rising gases.

When the system is in equilibrium, the annular passage section of the materials depends on the height of the valve 7, which can be adjusted by means of the screw 18. For this purpose, a hand lever 31 mounted on the support block 17 enables the height of the support block to be regulated with respect to the nut 19.

The vertical movements of the valve are limited by two adjustable stops; the first is a screw 32, which is mounted on the lever 20 and which, by abutting on the supports 22, limits the ascent of the valve; the second is a ring 33, which is threaded internally and engages with the screw 23, and which, by abutting on the cap 5, limits the descent of the valve.

A damping effect can be obtained by the addition of a damping means 34 preventing over-frequent opening variations.

The balancing system can be locked by raising the lever 25, which bears on a stop 38 secured to the support 22. The lever 20 no longer being loaded, the suspension element bears on the cap 5 by means of the threaded ring 33.

The section of the orifice can still be regulated by means of the screw 18.

When the system is locked in this position, the valve 7 may be lowered sufficiently for the tube to be cleaned; this is done by means of the suspension element and without changing the adjustment of the system. All that is necessary is slightly to raise the valve 7 by means of the handle 15 to unlock the links 13 and 14, and then to allow the valve to redescend until the upper ring 11 bears on the lower ring 12. The cap 5 has an orifice for the passage of the rod 8 closed by a seal 35, and a poking orifice 36 closed by a plug 37.

The system also enables the height of the orifice for pouring materials into the conduit 1 to be adjusted. The orifice for the entry of materials into the tube 4 is an oblong hole 38 partly closed by a pipe section 3, enabling the height of the tube 4 with respect to the conduit 1 to be varied. The pipe section 3 has a diameter slightly greater than that of the base of the valve 7 for the complete dismantling of the system for repairs.

The invention is not, of course, limited to the details of the embodiment just described. A fixed tube 4, mounted directly in the extension of the supply duct 2, may, in particular, be used. In addition, the nut 19 for supporting the valve may be mounted directly on the cap 5 or the enclosure 1. The lever 20 with a counter-weight may be replaced by any other calibrated support such as a spring, and, for rapid alteration of the height of the valve, the links 13 and 14 may be replaced by, for example, a rack or a peg locking the rod 8 in various positions. The system has been described with reference to the supply of materials to the ducts of a preheater, but it may be used for the satisfactory supply of any enclosure with powdery materials.

I claim:

1. A system for the introduction of powdery materials into an enclosure containing a gas comprising an enclosure, a supply duct for the materials opening into said enclosure, a vertical conduit open at the bottom and closed at the top vertically and slidably mounted through said enclosure, a seal between said enclosure and said vertical conduit, a pipe section within said enclosure slidably receiving said vertical conduit, said supply duct opening into said pipe section, an oblong aperture in said vertical conduit partially closed by said pipe section and directing the discharge from said supply duct into said vertical conduit, a movable valve closing the open bottom of said vertical conduit said valve being a cone with its apex faces upward, and means for controlling the position of said valve, including a rod secured to said cone reciprocal in the axis of said vertical conduit and extending through the closed end of said vertical conduit and through said enclosure, said means further including a suspension element secured to the top of said rod, a support for said suspension element having an adjustable position on said element and mounted on the closed end of said vertical conduit and a nut on said element engaging said support, said support being calibrated to resist the force exerted by said suspension element.

2. A system for the introduction of materials as claimed in claim 1, including an externally threaded support block slidably mounted on said rod, said nut being mounted on said threads.

3. A system for the introduction of materials as claimed in claim 1, said suspension element including means for rapidly altering the height of the point of attachment of said rod thereto.

4. A system for the introduction of materials as claimed in claim 3, said means for changing the point of attachment of said rod including at least two links pivoted together and mounted pivotally on the top of said rod and on said support means respectively, one of said links having a stop engaging the other of said links.

5. A system for the introduction of materials as claimed in claim 4, one of said links being mounted pivotally on a ring on said rod, said ring engaging said support means and a resilient disc between said ring and said support means.

6. A system for the introduction of materials as claimed in claim 1, said support including a lever, a pivot for said lever on the closed end of said conduit, a plate on said lever, a knife on said plate secured to said nut and a counter-weight at the end of said lever away from said nut.

7. A system for the introduction of materials as claimed in claim 6, said counter-weight including a weight, an arm for said weight, a pivot for said arm on the closed end of said conduit and a support peg on said arm engaging said support lever.

8. A system for the introduction of materials as claimed in claim 1, said conical valve including a conical surface whose apex points downwards.

9. A system for the introduction of materials as claimed in claim 1, said support including an adjustable stop for limiting the movement of said rod with respect to said vertical conduit.

10. A system for the introduction of materials as claimed in claim 9, said adjustable stop including a ring threaded internally, an external thread on said suspension element, said ring being mounted on said threads.

11. A system for the introduction of materials as claimed in claim 6, said support lever having an adjustable stop limiting the amplitude of the oscillations of said lever.